Patented May 5, 1942

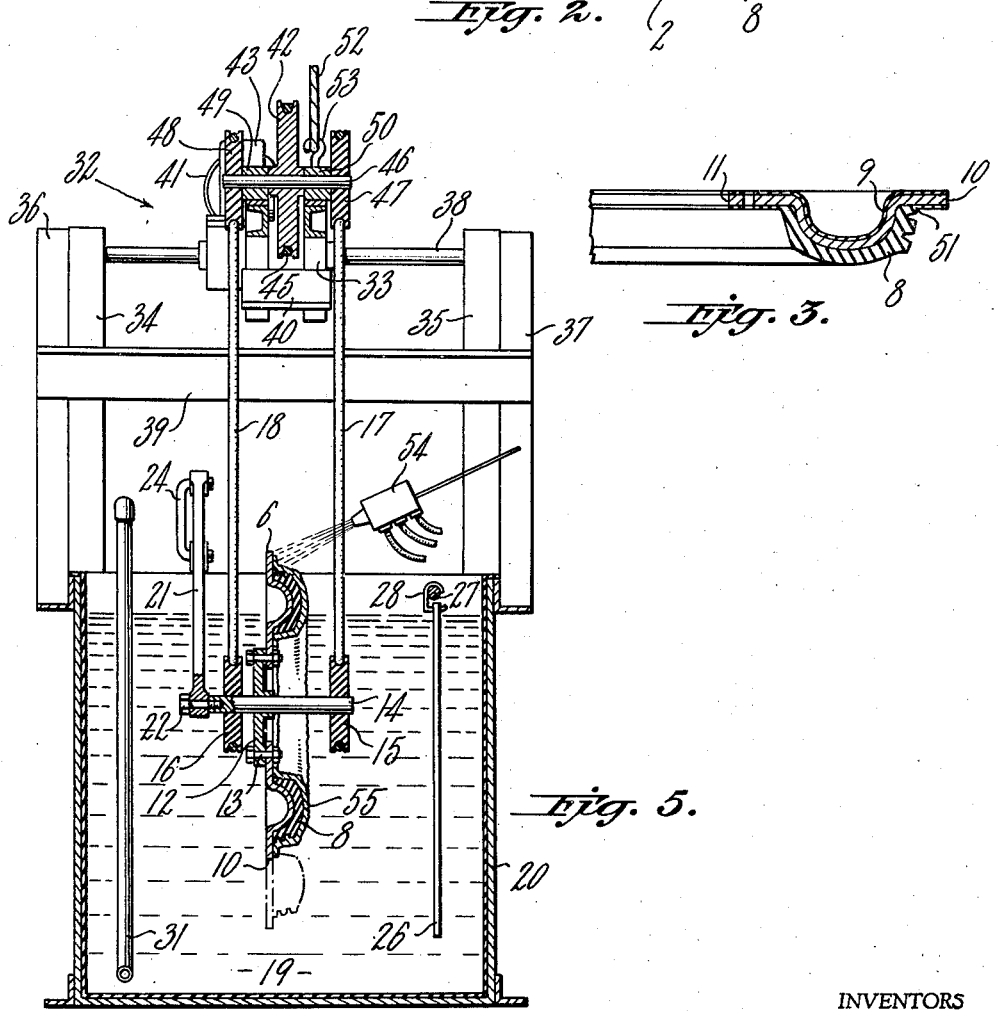

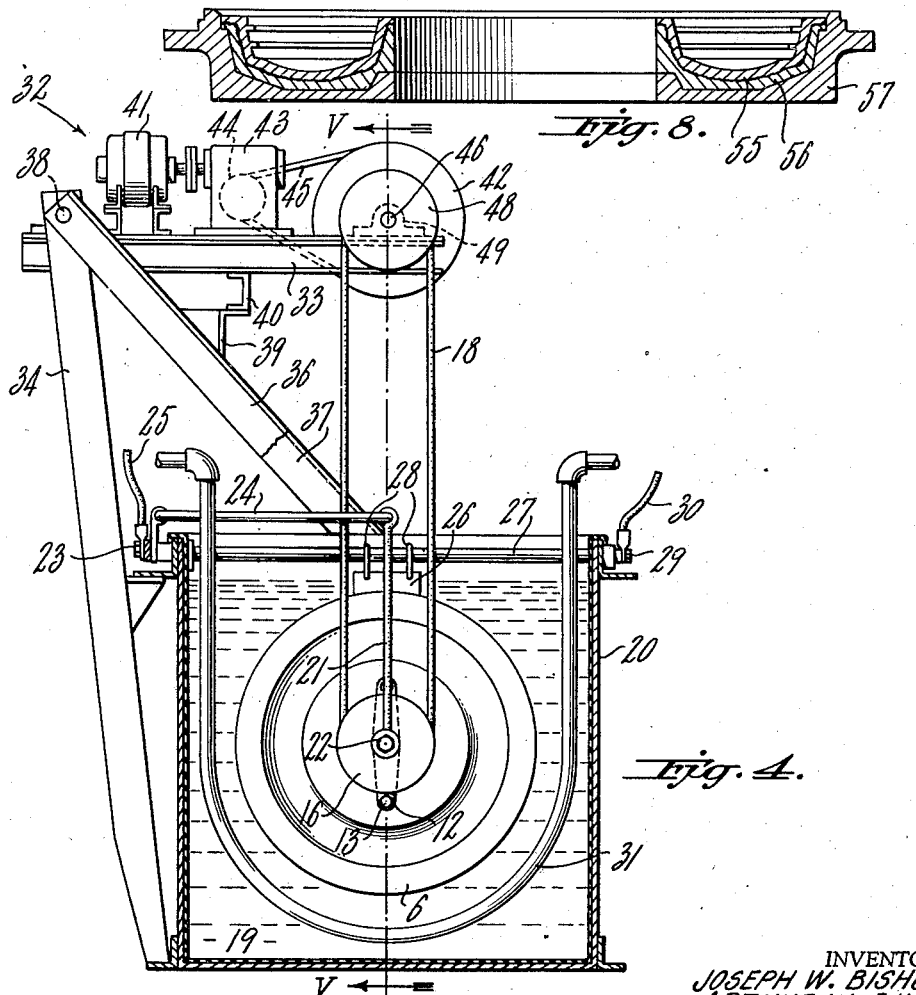

2,282,023

UNITED STATES PATENT OFFICE 2,282,023

ELECTROLYTIC APPARATUS FOR FORMING TIRE MOLDS

Joseph W. Bishop, Detroit, and Arthur W. Bull, Grosse Pointe, Mich., assignors, by mesne assignments, to United States Rubber Company, New York, N. Y., a corporation of New Jersey Original application August 31, 1937, Serial No. 161,736. Divided and this application August 16, 1938, Serial No. 225,128

2 Claims. (Cl. 204—215)

This invention relates to molds, and in particular to molds for pneumatic tires. More particularly, the invention relates to the formation of tire molds by the electrolytic deposition of a ferrous metal, being a divisional of application Serial No. 161,736, filed August 31, 1937. In general, the invention comprises the formation of molds the contour of which is determined by a matrix over which a metallic shell is formed primarily by electro-deposition, while deficiencies due to irregularities in plating are corrected by atomized thermal deposition of metal.

While the idea of forming molds by electrolytically depositing a shell of metal over non-metallic and electrically non-conductive surfaces is not new, use of this process as adapted to the construction of molds employed particularly in the manufacture of rubber tires has not been considered commercially satisfactory. Prior processes have been objectionable due to the difficulty of commercially electro-depositing a ferrous metal; one disadvantage among others being the difficulty of maintaining uniformity of thickness of electro-deposited metal, since in the process of electrolytically depositing a ferrous shell over a cathode of intricate design metal sometimes forms in thick deposits on areas near an anode while other areas and obscure corners receive little or no deposit of metal. The high cost of manufacture has also presented a problem difficult to overcome.

The process and apparatus of the present invention permits the production of a satisfactory tire mold by using a rubber form as a matrix on which an appropriate metal such as iron is deposited. Thus, in manufacturing a plurality of similar molds the difficulty of manually engraving a design for each individual mold is obviated, resulting in a considerable saving in cost of manufacture over the conventional mode of constructing tire molds. Furthermore, molds produced by our method are capable of withstanding constant daily use over as long a period as that obtained by molds of standard construction.

Another advantage of the mold constructed in accordance with our process is that, due to its multiple construction, parts of the mold which become defective or obsolete may be replaced without the necessity of discarding the mold in its entirety.

An additional advantage is the ease with which objectionable deficiencies in the electro-deposited ferrous metal may be corrected by application of thermoatomized metal without interfering with advantages accompanying continuous electro-deposition. Also, the coordination of the two modes of applying metallic deposits to a matrix permits the formation of homogeneous shell of ferrous metal.

Still another advantage derived in the use of the present process is the uniformity in thickness of the ferrous deposit on the matrix resulting from the dual deposition method, in combination with comparatively low cost.

These and other objects and advantages will appear more fully in the following detailed description when considered in connection with the accompanying drawings, in which:

Fig. 1 is a vertical view, in section, of a transaxial portion of a pneumatic tire mold;

Fig. 2 is a similar view showing a rubber matrix formed therein;

Fig. 3 is a fragmentary view, in section, illustrating a completed matrix;

Fig. 4 is a vertical view, in section, illustrating a plating tank and cathode rotating mechanism associated therewith;

Fig. 5 is a vertical view, in section, taken on section line V—V of Fig. 4; with the cathode and attached mechanism in raised position;

Fig. 6 is a transaxial view of a matrix after a deposit of metal has been applied thereto;

Fig. 7 is a transaxial view, in section, of a shell formed by deposited metal; and Fig. 8 is a transaxial view, in section of a tire mold constructed in accordance with the principles of the invention.

With reference to the drawings, and in particular to Fig. 1, we show a transaxial portion of a pneumatic tire mold of conventional construction comprising a single metal shell 1. This part of the mold comprises an exterior flat surface 2 and an opposing, substantially parallel, surface 3 adapted to contact and register with a corresponding side of a second transaxial portion of a mold to form a complete tire mold. A circular cavity 4 formed in the mold at the surface 3 includes a pattern or design 5 which may be in the form of any desired tread configuration used in pneumatic tires.

In order to produce a satisfactory matrix on which ferrous metal can be deposited, with the accompanying minimum of shrinkage and deformation of said matrix, it is preferable to employ a back plate 6 (Fig. 2) having an annular convex portion 7 integral therewith to support the contour of the matrix. When the parts are positioned in relationship with each other, as shown in Fig. 2, the convex side of the back plate projects into the mold cavity 4 and affords a substantially uniform space between walls thereof and the adjacent surface of the mold cavity. It it preferable to treat the convex side of the back plate in any convenient manner that will assure effective bonding of rubber to metal, such as by first electroplating the convex side with brass.

A matrix is formed by vulcanizing rubber in bonded relation with the convex side of the back plate 6, the exterior of the matrix assuming the configuration of the mold cavity. To effect this operation, uncured compounded rubber is cemented to the convex side of the back plate 6 or is placed in the mold cavity, the back plate and mold 1 are brought together under pressure, and the rubber is subjected to vulcanization. Upon disengagement of the plate from the mold, a matrix 8 has been formed, with a contour adequately supported and assuming a transaxial replica of a pneumatic tire. The matrix is made in transaxial form because it is customary to form tire molds in two separate units which when assembled form a complete pneumatic tire mold split along the transaxial plane.

An electrical insulation covering 9 of any suitable material such as rubber is applied to the exposed metal surface of the back plate 6, care being taken to leave areas 10 and 11 adjacent the rubber matrix exposed, as shown in Fig. 3, to afford an electrically conductive surface to the matrix. In order to render the non-conductive matrix surface electrically conductive, the surface thereof is painted or treated with a suitable material such as powdered carbon or graphite.

The thus assembled matrix 8 and back plate 6 are secured to a spider 12 in any convenient manner, preferably by bolts 13, 13, as shown in Fig. 5. The spider, in turn, is secured to a spindle 14 having sheaves 15 and 16 mounted at each end. The sheaves 15 and 16 engage with belts 17 and 18, respectively, and by means of the belts the weight of the spindle and attached parts is supported in a solution 19 contained in a rubber lined tank 20. One end of the shaft 14 engages with a connecting link 21, by means of a stud screw 22, in a manner permitting attachment of the link to the spindle, but allowing rotation of the stud 22 with the link 21. Mounted at one side of the tank 20 and electrically insulated therefrom is an electrical terminal 23 (Fig. 4) which is connected to the link 21 by an arm 24. A swivel joint at each end of the arm 24 allows substantially vertical movement of the matrix, yet assures effective electrical conductivity between a lead wire 25 and the surface of the matrix 8.

In order that current conducting parts such as the link 21, screw 22, pulleys 15 and 16, spindle 14, and spider 12 will afford no bare surfaces to attract a deposit of ferrous metal when immersed in the solution 19, they are covered with some suitable insulation substance such as rubber, care being taken, of course, that adjacent contacting surfaces at the joints remain free from the insulating material.

Adjacent one side of the tank 20 and opposite the matrix 8 a plate of ferrous metal 26 (Figs. 4 and 5) is suspended from a bus bar 27 by means of hooks 28. The extremity of the bus bar passes beyond the exterior of the tank and has mounted at the end thereof, an electrical terminal 29 to which a lead wire 30 is connected.

Although a number of ferrous plating solutions are well known in the electro-deposition art, good results have been obtained from a solution composed of 100 grams of ferrous chloride and 200 grams of calcium chloride per liter of solution. Proper acidity of the solution may be effected by the addition of suitable quantities of hydrochloric acid. In operation the matrix functions as a cathode upon which metallic iron from the solution is deposited. The plate 26 acts as the anode and dissolves in the solution, compensating for the loss of salts originally contained therein.

In order to avoid brittleness of the electroformed metal shell, it is preferable to heat the solution. This is accomplished by providing a heating coil 31 which may be connected to a source for generating steam. It has been found desirable to maintain the solution at a temperature between 175° Fahrenheit and 195° Fahrenheit.

During the electroforming process a more uniform and homogeneous deposit of the ferrous metal can be formed on the cathode by rotating the matrix-cathode about its axis. Rotation of the matrix is desirable due to the unavoidable presence of foreign particles in the solution. When these foreign particles come to rest on the cathode they soon become encased in electrolytic metal, and the density of the ferrous deposit is altered. Points on a cathode which are nearest the anode have a greater tendency to accumulate electrolytic metal than have surrounding areas, and this property is further accentuated as a deposit thus formed grows toward the anode.

Rotation of the cathode is effected by a mechanism 32 mounted on a platform 33 supported by upright posts 34 and 35 and obliquely disposed braces 36 and 37. The lower extremities of the posts and braces are secured to the tank 20 while the upper ends are joined together at a pivot shaft 38 to which the platform 33 is pivotally connected. The platform is free to swing upwardly but is limited in downward movement by a cross-rail member 39 affixed to the braces 36 and 37. A foot member 40 attached to the base of the platform 33 is adapted to contact with the cross-rail 39. A motor 41 mounted on the platform 33 imparts rotative motion to the pulley 42 through a gear reduction unit 43, pulley 44, and belt 45. The pulley 42 is keyed to a shaft 46 and drives pulleys 47 and 48 also rigidly secured to said shaft. The weight of the cathode assembly is sustained by the belts 17 and 18 passing over the pulleys 47 and 48, respectively. Bearings 49 and 50 mounted on the platform 33 support the shaft 46. By this disposition of driving means the cathode is rotated about its axis during deposition.

It is well known in the electro-plating art that the more remote points on the cathode receive less deposit than generally exposed surfaces. For example, in electro-forming a metallic shell about a matrix, as hereinbefore described, it has been found that electro-deposited metal does not accumulate readily in areas such as in the corner 51 (Fig. 3).

To correct this deficiency the cathode is raised to the extent that a portion thereof projects above the surface of the electrolyte. Fig. 5 illustrates the cathode in its raised position. Any convenient means, such as a rope 52 connected to a hook 53 secured to the bearing 50, may be utilized to elevate the cathode. Thermo-atomized metal is then sprayed into the corner 51, while the cathode is rotated. Means for depositing the thermo-atomized metal is provided in the form of a conventional apparatus 54 capable of generating and depositing fine particles of a metal such as iron in desired areas of the metal shell. Thus, electro-formed metal and thermo-atomized metal are co-ordinated in such a way that the thin portions of the electro-formed shell are effectively built up as by forming a fillet thereat. It has been found that when a deficiency is so corrected the supplementary metal and the electro-deposited metal form a homogeneous structure.

The current between the terminals 23 and 29 having been maintained for a sufficient period, a deposit of ferrous metal is formed on the cathode, preferably to an average depth of approximately ¼ inch, to form a shell 55 (Fig. 6). After the deposition is completed the shell may be separated from the matrix 6 and back plate 6 by heating the assembly in an oven to approximately 600° Fahrenheit, at which temperature the rubber is readily pulled away from the shell. This heating also has an annealing effect which increases the tensile strength of the electro-formed metal and renders it more suitable for machine operations.

The shell 55, having been segregated, as shown in Fig. 7, is provided with a metallic backing 56, for uniformly supporting the shell and for providing means for effectively securing the shell to an outer casing 57 of the finished mold. Effective rigid relationship may be established between the outer casing 57 and the electro-formed shell 55 in any conventional manner; as, for example, the two may be appropriately positioned in a sand mold and melted metal such as aluminum poured between them to occupy fully the intervening space; or, a suitable back may be applied to the shell 55 by embedding the same in a sand mold, then pouring fused metal over the back thereof after which the backing can be machined to a shape that will effectively register with the interior of the casing.

As a modification of this practice, the shell 55 may be backed up with metal applied by atomized thermal deposition. The sprayed metal thus deposited may be machined to fit the contour of the outer casing 57.

In accordance with the method and apparatus herein described, its advantages with reference to practical commercial application are believed apparent, and it is intended to include those modifications of the invention which appear within the scope of the appended claims.

Having thus described our invention, what we claim and desire to protect by Letters Patent is:

1. An apparatus for forming pneumatic tire molds comprising a tank containing an electrolyte, an annular matrix in the form of a trans-axial replica of a pneumatic tire adaptable for vertical immersion in the electrolyte, electro-deposition means for forming a ferrous shell upon the matrix, means for rotating the matrix about its axis during electro-deposition, means for applying an atomized thermal deposit of metal during rotation of the matrix and during the electro-deposition for increasing the thickness of at least a portion of the electro-deposited ferrous shell, means for adjustably positioning said matrix relative to the level of the electrolyte so that said depositions may be simultaneously deposited on portions thereof, and means for maintaining the electrolyte at a temperature between 175 degrees Fahrenheit and 195 degrees Fahrenheit during its electro-deposition.

2. An apparatus for forming pneumatic tire molds comprising a tank containing an electrolyte, an annular matrix in the form of a trans-axial replica of a pneumatic tire adaptable for vertical immersion in the electrolyte, electro-deposition means for forming a ferrous shell upon the matrix, means for rotating the matrix about its axis during electro-deposition, means for applying an atomized thermal deposit of metal during rotation of the matrix and during the electro-deposition for increasing the thickness of at least a portion of the electro-deposited ferrous shell, means for adjustably positioning said matrix relative to the level of the electrolyte so that said depositions may be simultaneously deposited on portions thereof, and means for heating the electrolyte.

JOSEPH W. BISHOP.
ARTHUR W. BULL.